(12) United States Patent
Fan

(10) Patent No.: US 7,746,526 B2
(45) Date of Patent: Jun. 29, 2010

(54) IMAGE PROCESSING APPARATUS AND IMAGE PROCESSING METHOD FOR GENERATING A COLOR SEPARATION TABLE USED IN CONVERTING AN IMAGE SIGNAL FOR THE AMOUNT OF A COLORANT

(75) Inventor: Yingying Fan, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 11/531,958

(22) Filed: Sep. 14, 2006

(65) Prior Publication Data

US 2007/0064251 A1 Mar. 22, 2007

(30) Foreign Application Priority Data

Sep. 20, 2005 (JP) ............................. 2005-272652

(51) Int. Cl.
*H04N 1/60* (2006.01)
(52) U.S. Cl. ...................... 358/515; 358/1.9; 358/3.23; 347/6
(58) Field of Classification Search .................. 358/1.9, 358/515, 3.23, 501, 518; 347/6
See application file for complete search history.

(56) References Cited

FOREIGN PATENT DOCUMENTS

| EP | 1365579 A2 | * | 11/2003 |
|---|---|---|---|
| JP | 2001-061076 A | | 3/2001 |
| JP | 2001061076 A | * | 3/2001 |
| JP | 2006-060378 A | | 3/2006 |

* cited by examiner

*Primary Examiner*—King Y Poon
*Assistant Examiner*—Jamares Washington
(74) *Attorney, Agent, or Firm*—Canon U.S.A., Inc. I.P. Division

(57) ABSTRACT

An image processing method generates a color separation table, the color separation table being used in converting an image signal to a signal for a colorant for use in a printer and storing grid-point data as the colorant signal so as to associate the grid-point data with a grid point defined by the image signal. The image processing method includes obtaining data of a first color separation table and generating a second color separation table based on the difference between a maximum allowable amount of colorant discharge for the first color separation table and a maximum allowable amount of colorant discharge for the second color separation table and the data of the first color separation table so that a total amount of colorant discharge of the second color separation table does not exceed the maximum allowable amount of colorant discharge for the second color separation table.

14 Claims, 13 Drawing Sheets

IMAGE PROCESSING APPARATUS AND IMAGE PROCESSING METHOD FOR GENERATING A COLOR SEPARATION TABLE USED IN CONVERTING AN IMAGE SIGNAL FOR THE AMOUNT OF A COLORANT

BACKGROUND OF THE INVENTION

1. Field of the Invention

The present invention relates to an image processing apparatus and an image processing method, and in particular, to generation of a color separation table used in converting an image signal into a signal for the amount of a colorant, such as ink and toner.

2. Description of the Related Art

FIG. 11 is a flowchart showing an example of generation of a color separation table. First, grid-point data is determined on the basis of calorimetric values of a patch (step S11-1). Then, grid-point data on grid points lying on the lines connecting eight vertexes of the color separation table, i.e., six lines of W-C, M, Y, R, G, and B, six lines of C, M, Y, R, G, and B-K, and other lines of M-R, R-Y, Y-G, G-C, M-B, B-C, W-K, wherein W denotes white, C denotes cyan, M denotes magenta, Y denotes yellow, R denotes red, G denotes green, B denotes blue, K denotes black, is determined (step S11-2). Grid-point data of grid points other than the grid points determined in S11-2 is determined by interpolation processing (step S11-3). After the interpolation processing, the grid-point data is subjected to smoothing processing to reduce discontinuity at the boundaries of interpolation areas and other undesired states (step S11-4). Then, the grid-point data of the entire smoothed table is compared with the maximum allowable amount of discharge for a print medium, and it is determined whether a grid point that has grid-point data exceeding the maximum allowable amount of discharge is present or not. If such a grid point is present, the amount of discharge regarding the grid point is corrected (step S11-5).

For the sake of improving recording image quality, different types of recording media for use in recording are selectively used.

In the case where multiple types of recording media are selectively used, grid-point data for respective recording media is determined on the basis of adhesion characteristics of colorants to the recoding media (e.g., paper). For example, when ink is used as the colorant, grid-point data is determined so as to control the amount of the colorant on the basis of absorbency of a recording medium to the ink. In other words, the maximum allowable amount of ink that can be absorbed in the recording medium per a predetermined area is obtained in advance, and the amount of the colorant for each color is corrected so as not to exceed the maximum allowable amount.

FIG. 12 illustrates an example of color separation on the W-K line for a first recording medium before the amount of discharge is corrected. The horizontal axis represents the value of a grid point, and the vertical axis represents the value of a signal. Aside from the value of a signal, the vertical axis represents the maximum allowable amount of discharge which is, in this example, 160. Since the total amount of ink discharge exceeds the maximum allowable amount of discharge, recording on the recording medium without correcting the amount of ink discharge results in an overflow of ink.

FIG. 13 illustrates an example of the color separation on the W-K line shown in FIG. 12 after the amount of discharge is corrected. Since the amount of discharge has been corrected, the total amount of discharge does not exceed the maximum allowable amount of discharge and the recording medium can absorb ink without causing the ink to overflow.

FIG. 14 illustrates an example of color separation on the W-K line for a second recording medium before the amount of discharge is corrected.

FIG. 15 illustrates an example of the color separation on the W-K line shown in FIG. 14 after the amount of discharge is corrected. The maximum allowable amount of discharge for the second recording medium is 190 which is larger than that for the first recording medium shown in FIGS. 12 and 13.

However, generation of a color separation table for each type of a recording medium for use in recording increases the design workload. The design workload significantly increases with an increase in the number of types of recording media.

Even when color separation tables corresponding to different types of recording media are designed, the tables are often required to be designed in the same period of time as in designing of a color separation table corresponding to a single type of recording medium. Therefore, it is difficult to allocate time among the generations of the color separation tables corresponding to the different types of recording media.

SUMMARY OF THE INVENTION

The present invention provides an image processing apparatus and an image processing method capable of generating a first color separation table for one recording medium and then generating another color separation table using the first color separation table.

According to one aspect of the present invention, an image processing apparatus performs image processing by using a color separation table, the color separation table being used in converting an image signal to a signal for a colorant for use in a printer and storing grid-point data as the colorant signal so as to associate the grid-point data with a grid point defined by the image signal. The image processing apparatus includes a storing unit configured to store a first color separation table and a generation unit configured to generate a second color separation table based on the difference between a maximum allowable amount of colorant discharge for the first color separation table and a maximum allowable amount of colorant discharge for the second color separation table and the first color separation table so that a total amount of colorant discharge of the second color separation table does not exceed the maximum allowable amount of colorant discharge for the second color separation table.

Further features of the present invention will become apparent from the following description of exemplary embodiments with reference to the attached drawings.

DESCRIPTION OF THE EMBODIMENTS

Exemplary embodiments of the present invention are described below with reference to the accompanying drawings.

First Exemplary Embodiment

Figure 1:
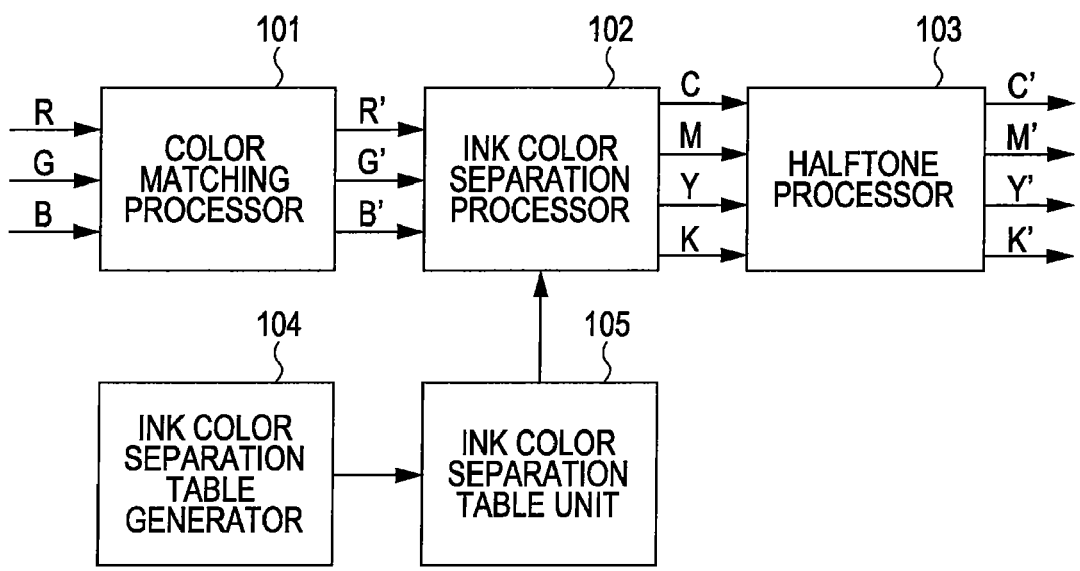
FIG. 1 is a block diagram of an image processing apparatus according to a first exemplary embodiment of the present invention.

FIG. 1 is a block diagram of an image processing apparatus according to a first exemplary embodiment of the present invention. The image processing apparatus in this exemplary embodiment is configured as software or hardware processing in a printer, as described below with reference to FIG. 2. However, the present invention is not limited to this configuration. For example, the present invention can be processing of software such as a printer driver operable in a personal computer.

FIG. 1 illustrates processing of converting R, G, and B image data segments, each of which is 8 bits, into C, M, Y, and K color-separation data segments, each of which is 8 bits and corresponds to an ink colorant used in a printer in the exemplary embodiment, and then forming the data segments into quantized C, M, Y, and K data segments and other data segments, each of which is 2 bits. In FIG. 1, a color matching processor 101 performs color conversion for matching the range of color reproduction of input image data segments R, G, and B with the range of color reproduction in the printer. An ink color separation processor 102 refers to a color separation table on the basis of data segments R', G', and B' from the color matching processor 101 and obtains grid-point data. In addition, the ink color separation processor 102 converts the data segments R', G', and B' into the data segments C, M, Y, and K and other data segments corresponding to ink colors for use in the printer by performing interpolation computation using the grid-point data. A halftone processor 103 converts the 8-bit data segments corresponding to ink colors determined in the color separation processor 102 into binary data segments C', M', Y', and K' and other data segments for use in the printer. An ink color separation table unit 105 stores and provides a color separation table (in the form of a lookup table) used in color conversion in the ink color separation processor 102. An ink color separation table generator 104 generates the ink color separation table, as described below with reference to FIG. 3 and subsequent drawings.

Figure 2:
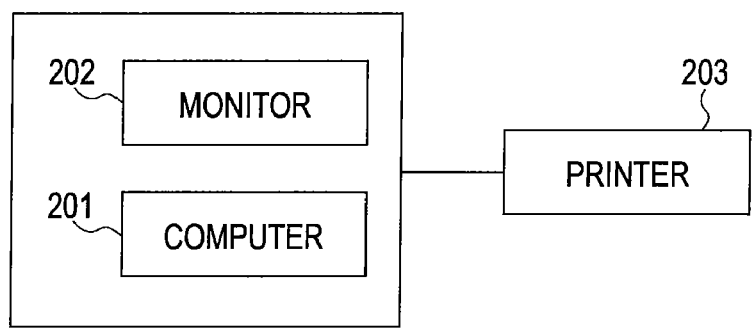
FIG. 2 is a block diagram of a print system according to the first exemplary embodiment of the present invention.

FIG. 2 is a block diagram of a print system according to the first exemplary embodiment. The print system includes the printer serving as the image processing apparatus shown in FIG. 1.

In FIG. 2, a computer 201 and a monitor 202 constitutes a host device for a printer 203. The computer 201 holds image data used for printing in order to print an image displayed on the monitor 202 by using the printer 203. The computer 201 supplies the image data to the printer 203 when performing printing. The printer 203 has the structure of image processing illustrated in FIG. 1 and functions as the image processing apparatus. More specifically, a controller of the printer 203 includes a central processing unit (CPU), a random-access memory (RAM), and a read-only memory (ROM). These components form the processing units illustrated in FIG. 1, and execute processing described below with reference to FIGS. 5 and 6. The printer 203 includes an inkjet printing mechanism in this exemplary embodiment. Therefore, the printer 203 scans a recording medium with recording heads corresponding to process color inks of yellow (Y), magenta (M), cyan (C), and black (K), a distinctive color ink, and a light-colored ink. During the scanning, the printer 203 sprays the ink droplets onto the recording medium and coveys the recording medium by a predetermined amount to perform printing. The printing method is not limited to the inkjet method. For example, an elctrophotographic method which uses toner as a colorant can be used.

In the print system described above, image data held in the computer 201 is transmitted to the printer 203 via a cable connected therebetween. Image data can be transmitted to the printer 203 from another host device connected to a network (not shown). When the printer 203 receives the image data, the color matching processor 101 (illustrated in FIG. 1) performs color matching processing which matches the range of color reproduction in the monitor 202 with that in the printer 203. More specifically, the color matching processing is color conversion using both a lookup table and interpolation computation. The data segments R', G', and B' subjected to the color matching processing are color separated in the ink color separation processor 102 through interpolation computation using table data in the ink color separation table unit 105 which uses a previously generated lookup table. More specifically, the ink color separation processor 102 refers to the ink color separation table unit 105 on the basis of the data segments R', G', and B' and reads color separation data segments C, M, Y, and K and other data segments. In addition, the ink color separation processor 102 performs interpolation computation on the read values in accordance with the values of the data segments R', G', and B' and obtains the final color separation data segments C, M, Y, and K and other data segments which have been color matched. These 8-bit image data segments are converted into binary data segments C', M', Y' and K' and other data segments for use in the printer in the halftone processor 103 and are used in printing. Quantization in the halftone processor 103 is not limited to binarization. For example, quaternary or quinary data can be used depending on the dot pattern or the form of the printing mechanism.

The table data stored in the ink color separation table unit 105 has been previously generated by the ink color separation table generator 104. Generation processing of the table data according to the first exemplary embodiment is described below with reference to FIGS. 3 to 10.

Figure 3:
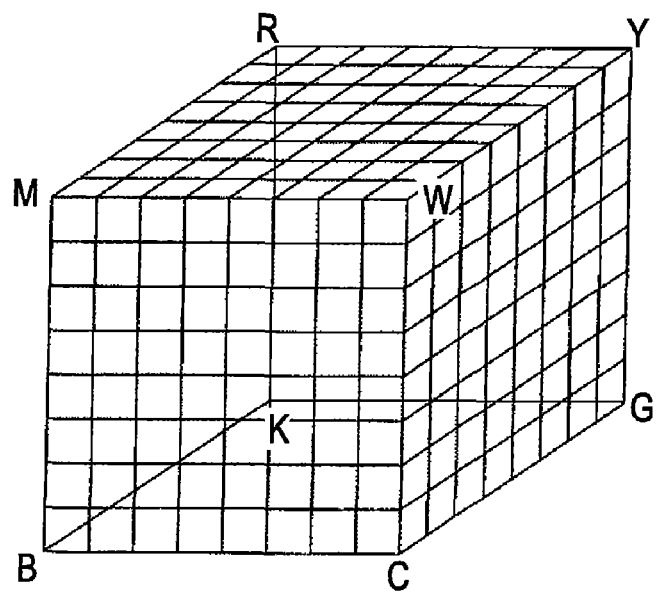
FIG. 3 is a diagram of a color separation table in a color separation table unit.

FIG. 3 is a diagram of a color separation table in the ink color separation table unit 105. The ink color separation table unit 105 represents a predetermined position (color) in a cube defined by the input data segments R', G', and B' as a grid point. In addition, the ink color separation table unit 105 stores as the table data values of the color separation data segments (grid-point data segments) Y, M, C, and K and other data segments corresponding to distinctive color and light-colored inks associated with the grid points. The ink color separation processor 102 identifies a predetermined grid point on the basis of the input data segments R', G', and B', reads grid-point data of the identified grid point and the adjacent predetermined grid points, and performs interpolation processing by using the grid-point data. The interpolation processing can use any known interpolation method, for example, tetrahedral interpolation or a cubic interpolation.

Figure 4:
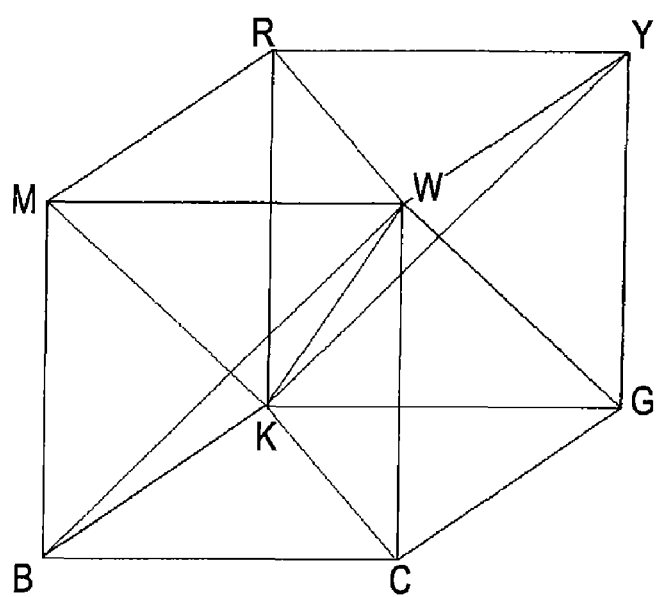
FIG. 4 is an illustration used to describe a method for generating a color separation table.

FIG. 4 is an illustration used to describe a method for generating a color separation table.

In this exemplary embodiment, as illustrated in FIG. 4, grid-point data of grid points lying on the lines connecting eight vertexes in a cube, consisting of six lines of W-C, M, Y, R, G, and B, six lines of C, M, Y, R, G, and B-K, and other lines M-R, R-Y, Y-G, G-C, M-B, B-C, and W-K, is determined. Then, grid-point data of grid points other than the previously determined grid points is determined by interpolation computation.

The exemplary embodiment is described below using two types of recording media. In this exemplary embodiment, a first type of a recording medium is referred to as medium 1, and a second type of a recording medium is referred to as medium 2. Ink colors used in both medium 1 and medium 2 are cyan (C), magenta (M), yellow (Y), black (K), light cyan (Lc), and light magenta (Lm).

Figure 5:
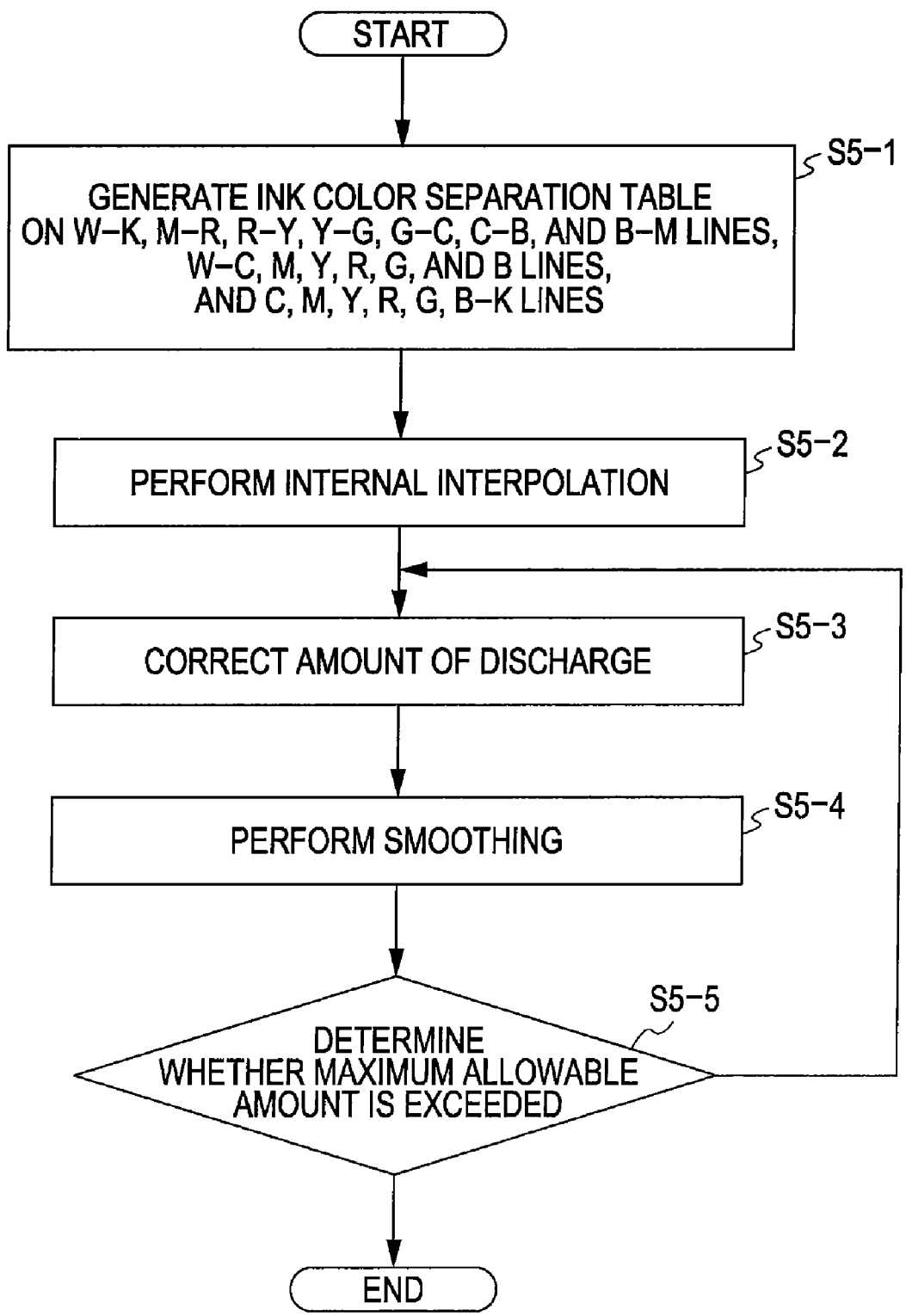
FIG. 5 is a flowchart showing a process of generating a color separation table for medium 1.

FIG. 5 is a flowchart showing a process of generating a color separation table for medium 1.

In step S5-1, grid-point data of grid points on the W-K, M-R, R-Y, Y-G, G-C, C-B, and B-M lines, the W-C, M, Y, R, G, B lines, and the C, M, Y, R, G, B-K lines is determined, and a color separation table relating to the grid points is generated.

In this exemplary embodiment, combinations of values obtained by dividing values ranging from 0 to 255 represented by 8 bits for each of C, M, Y, K, Lc, and Lm into 16 equal parts are printed out as patches by using a printer in advance, they are measured, and their respective calorimetric values are held. The grid-point data (color separation data) of grid points being the vertexes are predetermined. For example, a vertex of Y is predetermined as (C, M, Y, K, Lc, Lm)=(0, 0, 255, 0, 0, 0). For the grid-point data (color separation data) of grid points lying on the lines connecting the vertexes, data (Y, M, C, K, Lc, Lm) which is output patches of respective calorimetric values that are closest to calorimetric values equally distributed grid points is determined as grid-point data of the respective grid points. In the above basic table generation, by selecting the patches so as to set the optimal amount of undercolor removal (UCR) and the optimal amount black generation (BG) for each hue, a table can be set in which granularity caused by a black ink can be minimized while at the same time the range of color reproduction can be maximized. In addition, according to a used distinctive color, several lines among the lines set in this step can be set as lines passing through grid points corresponding to the distinctive color.

In step S5-2, internal interpolation processing is performed on the basis of the grid-point data of the grid points lying on the lines determined in step S5-1 to determine grid-point data of grid points other than the grid points lying on the lines.

The internal interpolation processing can use any known method. The outline is described below. Ink colors of cyan, magenta, yellow, black, light cyan, and light magenta for determining the ink values of the grid points are successively selected. Then, a tetrahedron for performing interpolation is selected and divided into a plurality of triangles. One examples of the division into a plurality of triangles is the division of a tetrahedron defined by the vertexes R, Y, K, and W into surface and inner triangles. The tetrahedron is first divided into surface triangles defined by vertexes of R-Y-K, R-Y-W, K-W-R, and K-W-Y. Then, the inner space of the tetrahedron RYKW is divided into inner triangles parallel to the triangle R-Y-W. The number of inner triangles corresponds to the number of grid points. Then, each of the target triangles obtained by the above-described division is subjected to two-dimensional interpolation processing. The ink value of each target grid point is determined by calculating the distance between an ink contour being a result of the interpolation processing and each of the grid points. More specifically, the smallest distance between the ink contour being a result of the interpolation processing and each grid point is determined as the ink value at the target grid point. The interpolation processing can be carried out by successively performing this process on each ink color.

After the interpolation processing in step S5-2, correction processing of the amount of discharge is performed in step S5-3. The correction processing uses a correction factor k, and the correction factor k varies according to the result of determination in step S5-5 whether the amount of discharge exceeds the maximum allowable amount, which is described below. More specifically, for a color separation table, if there is a grid point having grid-point data whose amount of discharge is determined to exceed the maximum allowable amount, the values of all grid-point data of the table are multiplied by the correction factor to correct the amount of discharge. The correction factor $k(n)$ of the amount of discharge varies the number, n, of loops formed by steps S5-3 and S5-4. The correction factor k of the amount of discharge is set to $k(n)=\alpha k(n-1)$. Therefore, when the processing returns to step S5-3 in accordance with the determination of step S5-5, the correction factor k is multiplied by $\alpha$ each return. When the initial value $k(0)$ is used, $k(n)=\alpha^n k(0)$.

Then, correction processing is performed by multiplying all grid-point data of the entire color separation table by the correction factor $k(n)$ of the amount of discharge. The correction processing of the amount of discharge performed on the entire color separation table can reduce influence on smoothing processing. Instead of such a general correction, the correction of the amount of discharge may be performed on a local area, such as a 3×3×3 area. In this case, influences exerted by the correction of the amount of discharge upon smoothing can also be reduced.

The correction processing gradually corrects grid points having grid-point data whose amounts of discharge exceed the maximum allowable amount in a color separation table, so that the final color separation table has no grid points exceeding the maximum allowable amount.

Figure 6:
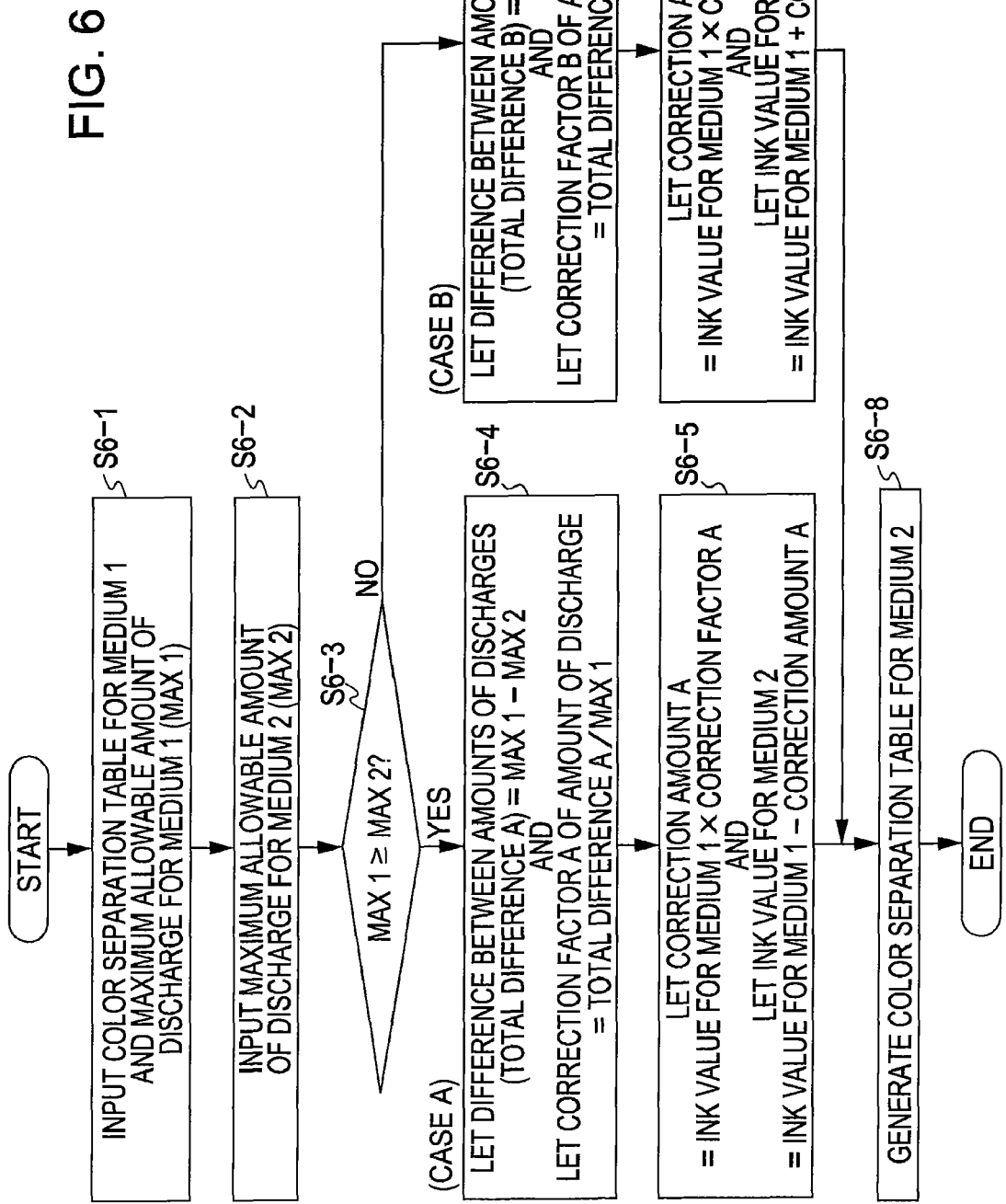
FIG. 6 is a flowchart showing a process of generating a color separation table for medium 2.

FIG. 6 is a flowchart showing a process of generating a color separation table for medium 2.

In step S6-1, the color separation table for medium 1 and the maximum allowable amount of discharge for medium 1 (MAX 1) are input to the ink color separation table generator 104. In step S6-2, the maximum allowable amount of discharge for medium 2 (MAX 2) is input to the ink color separation table generator 104. In step S6-3, a comparison between MAX 1 and MAX 2 is performed. If MAX 1 is equal to or greater than MAX 2, the processing proceeds to steps S6-4 and S6-5 and reaches step S6-8 (case A). If MAX 1 is less than MAX 2, the processing proceeds to steps S6-6 and S6-7 and reaches step S6-8 (case B).

In steps S6-4 and S6-6, the difference between MAX 1 and MAX 2 is calculated. In step S6-4, since MAX $1 \geq$ MAX 2, the difference between the amounts of discharge in case A (Total Difference A) is determined by the following expression:

$$\text{Total Difference } A = \text{MAX } 1 - \text{MAX } 2 \text{ (for case } A\text{)}$$

In contrast, in step S6-6, since MAX 1<MAX 2, the difference between the amounts of discharge in case B (Total Difference B) is determined by the following expression:

Total Difference $B$=MAX 2−MAX 1 (for case $B$)

Then, the correction factor of the amount of discharge is calculated using the total difference and MAX 1 by the following expression:

Correction Factor of Amount of Discharge=Total Difference/MAX 1

Therefore, the correction factor of the amount of discharge in case A (correction factor A) and that in case B (correction factor B) are determined by the following expressions:

Correction Factor $A$=Total Difference $A$/MAX 1 (for case $A$)

Correction Factor $B$=Total Difference $B$/MAX 1 (for case $B$)

Then, the correction amount for each color is calculated, and the ink value at each grid point for medium 2 is determined (steps S6-5 and S6-7). The correction amount for each color is determined by multiplying each of the ink values at grid points for medium 1 by the correction factor of the amount of discharge, and the ink values for medium 2 is determined by adding the correction amount to or by subtracting the correction amount from the ink value for medium 1. Therefore, both in case A are determined in step S6-5 by the following expressions:

Correction Amount $A$=Ink Value for Medium 1×Correction Factor $A$

Ink Value for Medium 2=Ink Value for Medium 1−Correction Amount $A$

Both in case B are determined in step S6-7 by the following expressions:

Correction Amount $B$=Ink Value for Medium 1×Correction Factor $B$

Ink Value for Medium 2=Ink Value for Medium 1+Correction Amount $B$

After the ink values at all grid points for each color are determined, the determined data is stored in the color separation table for medium 2 in step S6-8.

Figure 7:
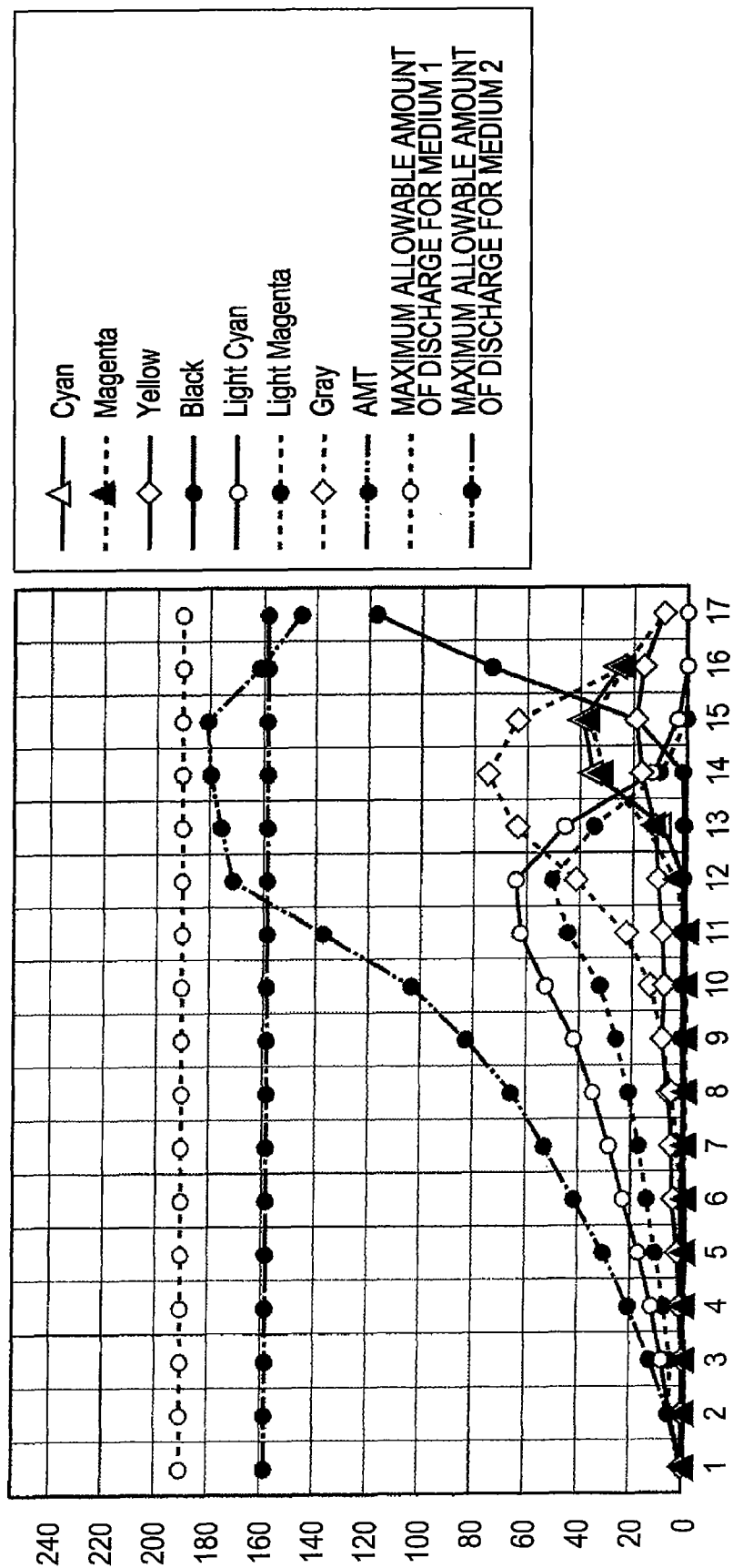
FIG. 7 illustrates a result of color separation for medium 1.

FIG. 7 illustrates an example of color separation on the W-K line for medium 1 in case A shown in FIG. 6.

Figure 8:
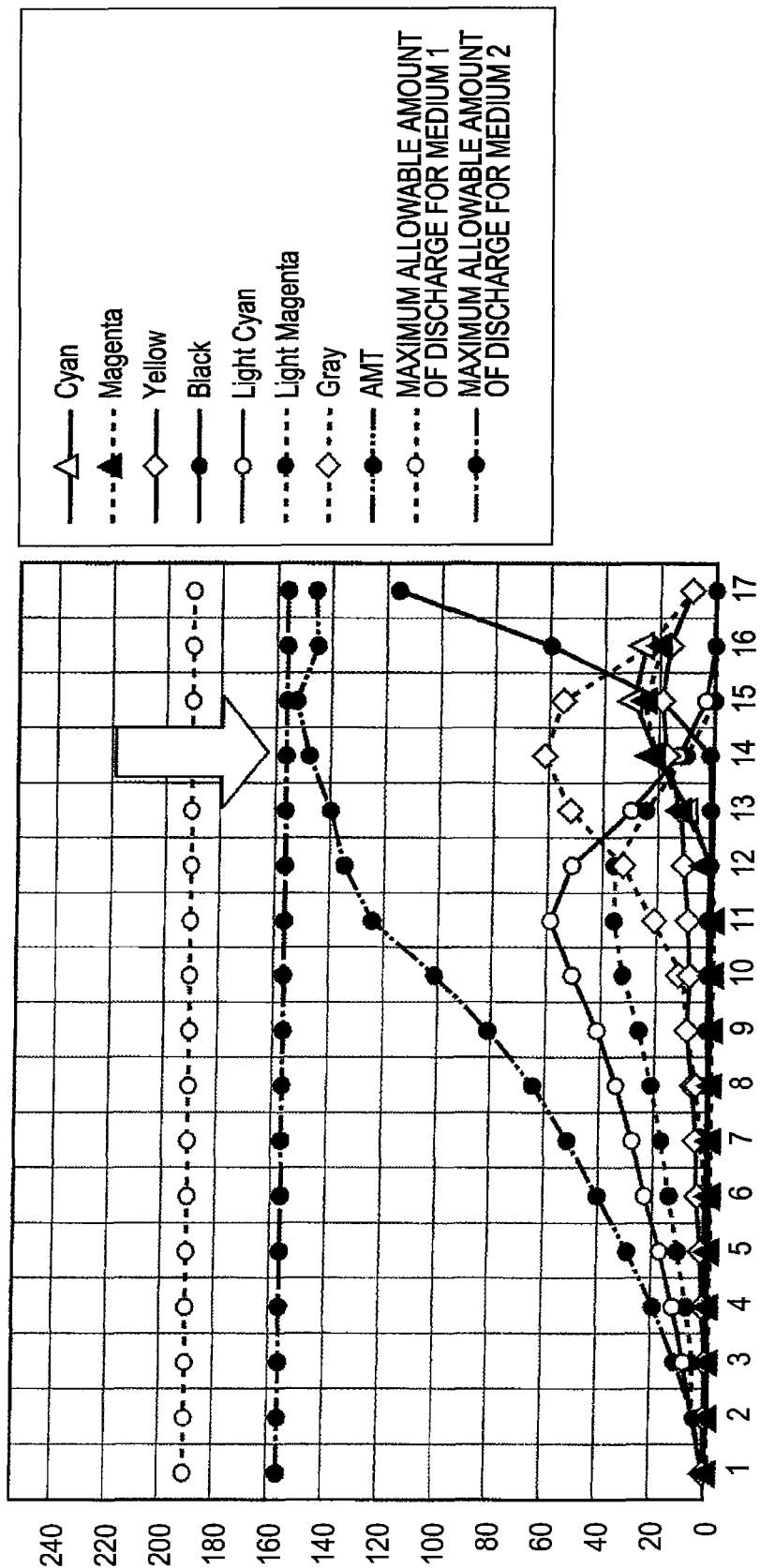
FIG. 8 illustrates a result of color separation for medium 2.

FIG. 8 illustrates an example of color separation on the W-K line for medium 2 in case A shown in FIG. 6.

In this case, MAX 1 is 190 and MAX 2 is 160. The total amount of discharge for medium 2 does not exceed 160. For example, the ink value of cyan ink at grid point 11 for medium 1 is 62.5. After the correction of the amount of discharge, the ink value of cyan ink at grid point 11 is 59.

Figure 9:
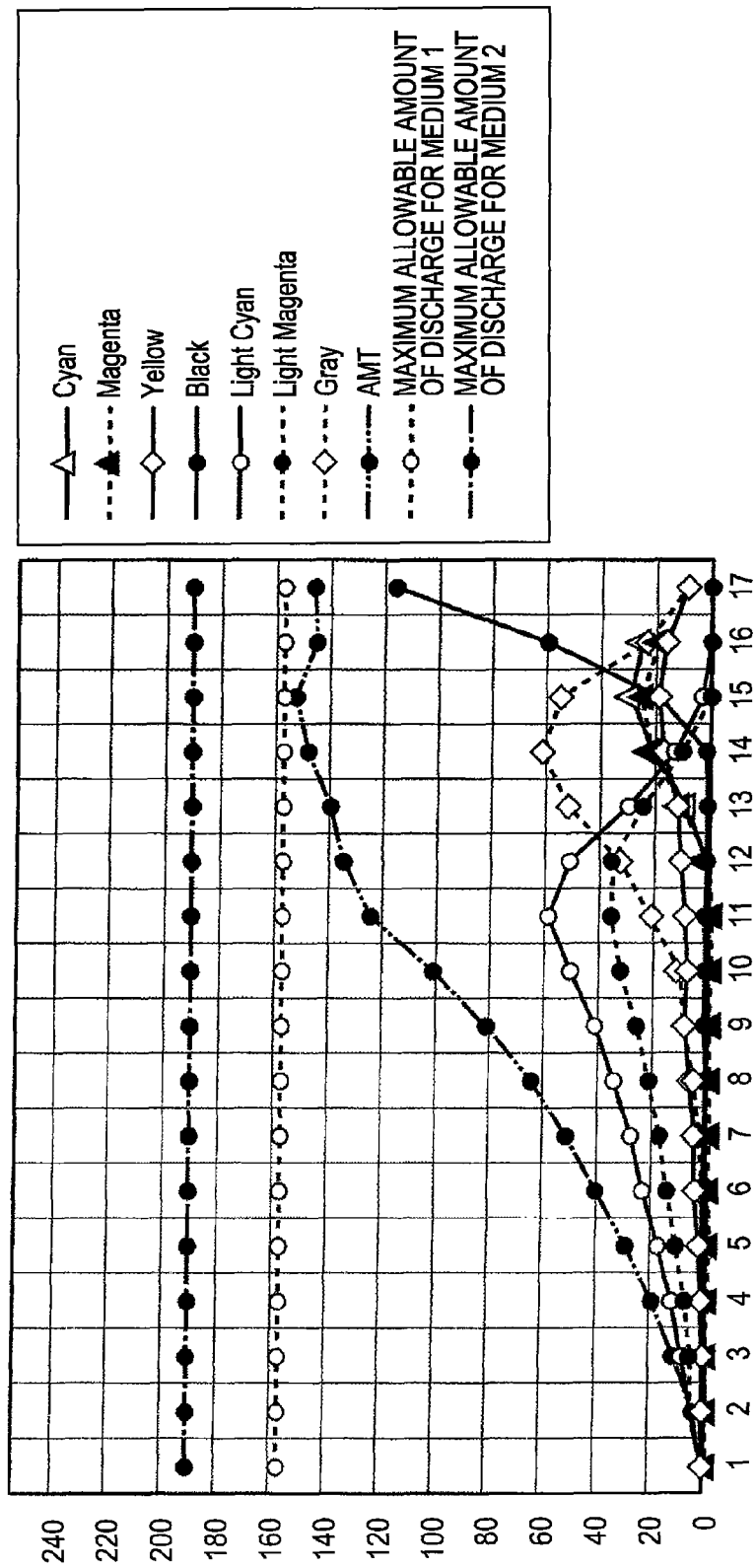
FIG. 9 illustrates another result of color separation for medium 1.

FIG. 9 illustrates an example of color separation on the W-K line for medium 1 in case B shown in FIG. 6.

Figure 10:
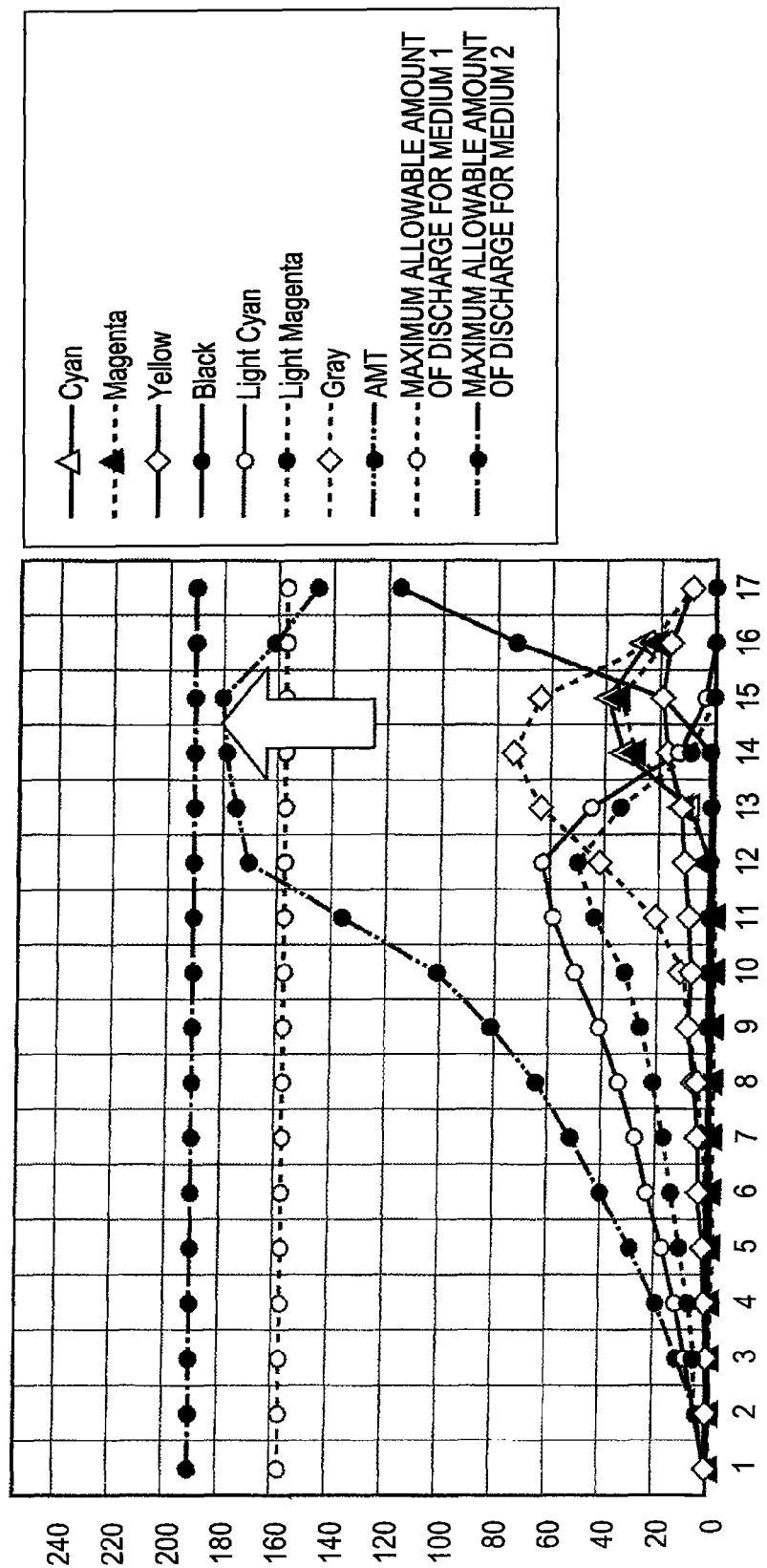
FIG. 10 illustrates another result of color separation for medium 2.
Figure 11:
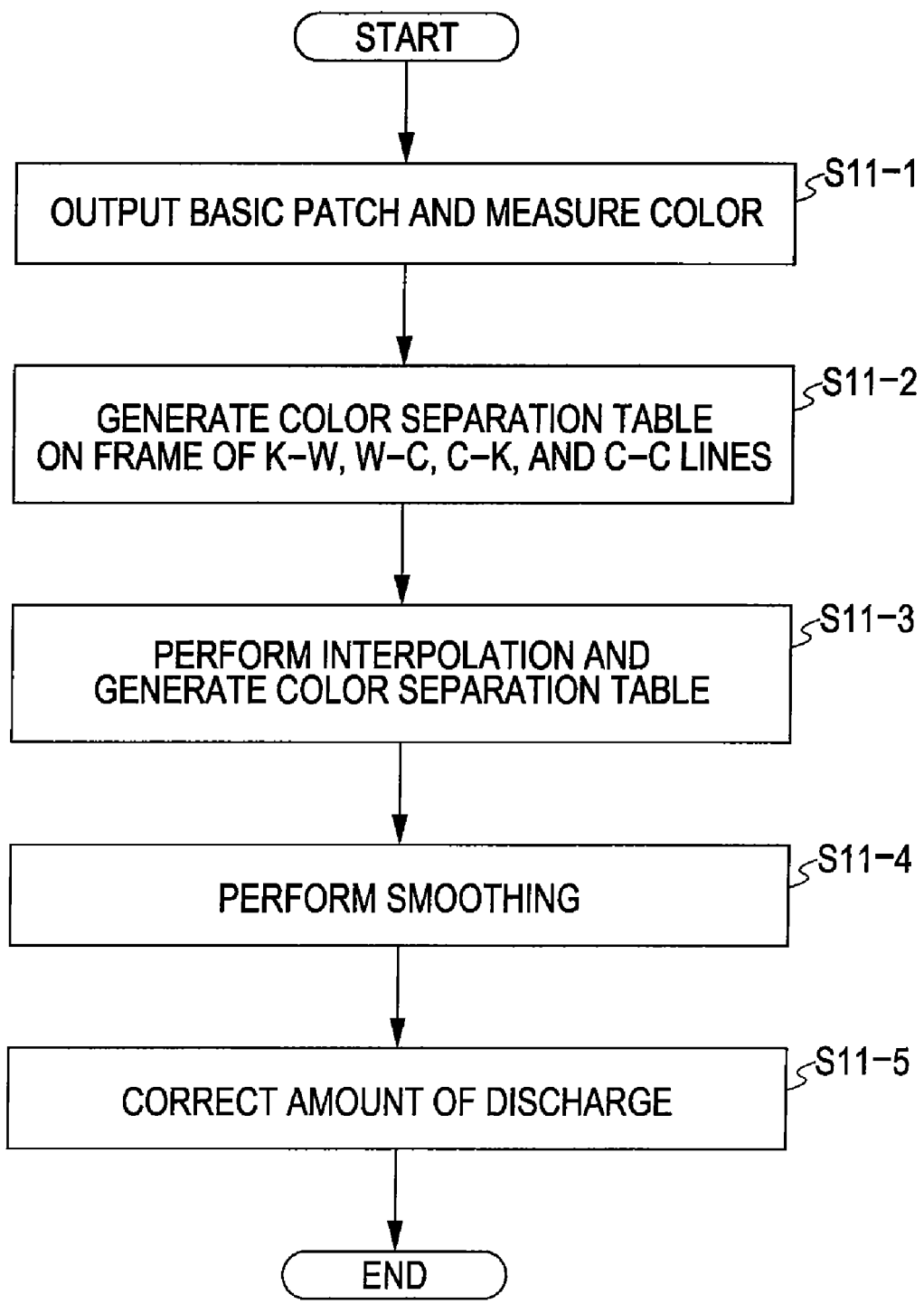
FIG. 11 is a flowchart of a process of generating a table in a conventional art.
Figure 12:
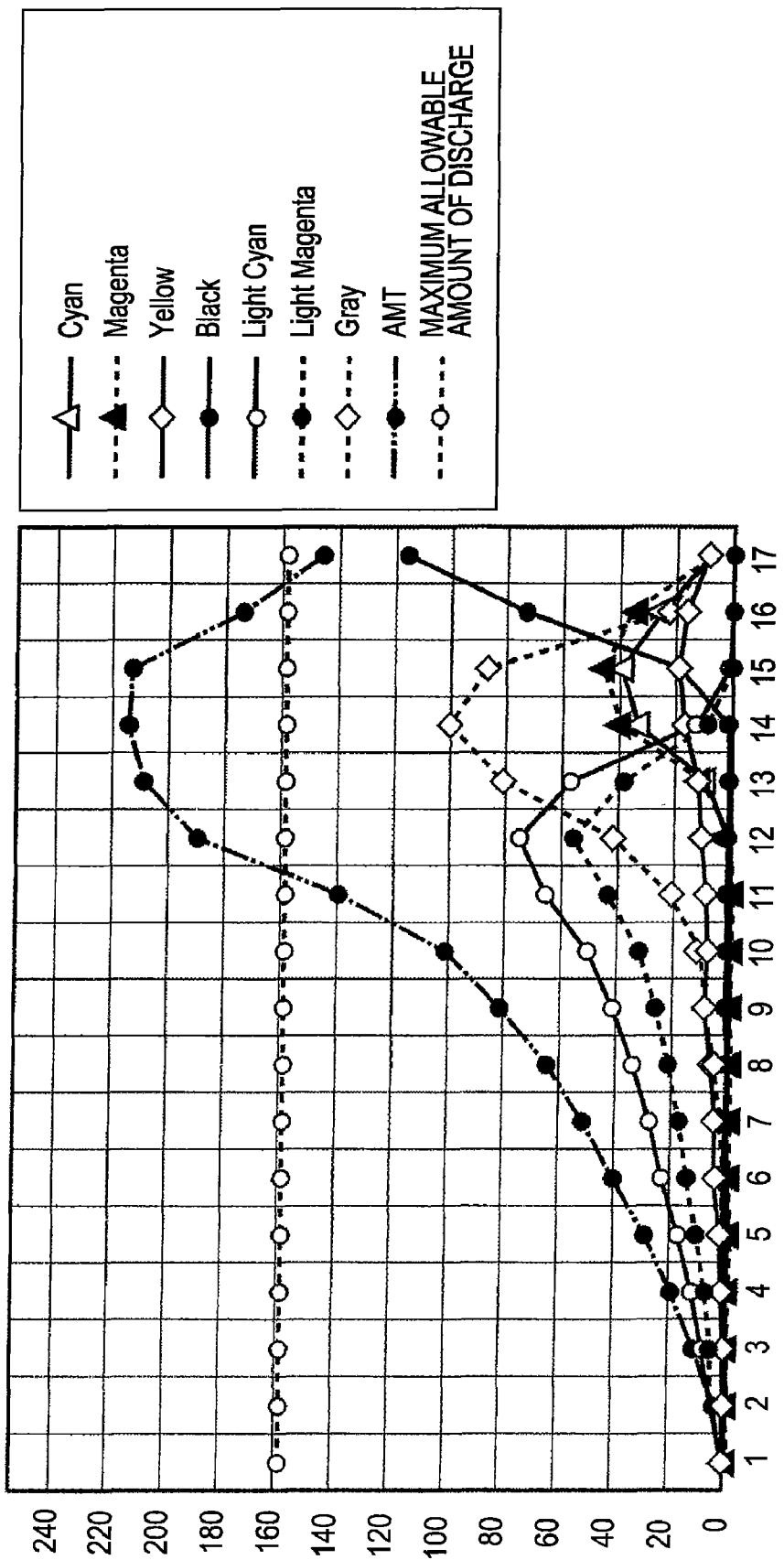
FIG. 12 illustrates one example of color separation before the amount of discharge is corrected in a conventional art.
Figure 13:
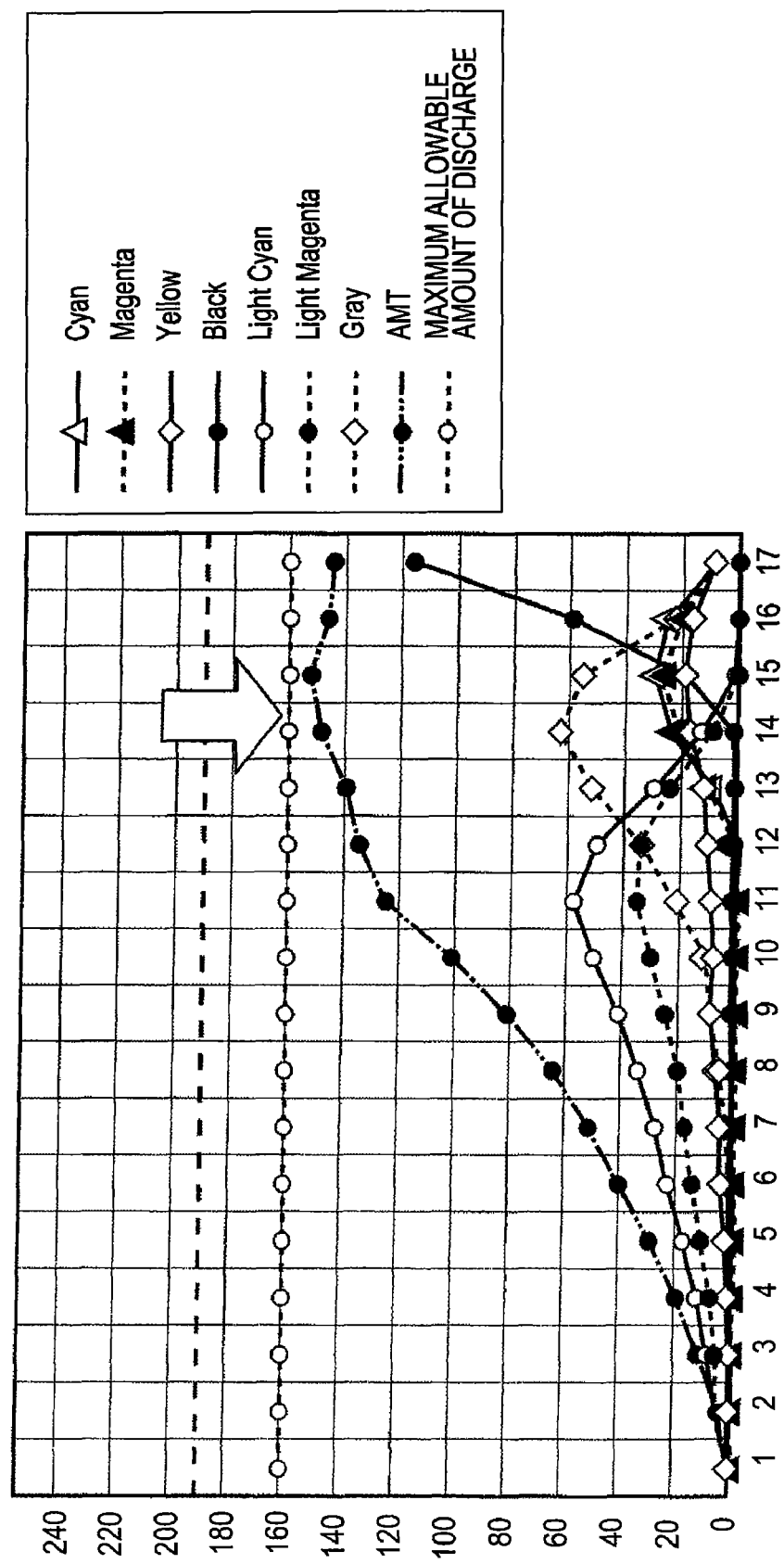
FIG. 13 illustrates one example of color separation after the amount of discharge is corrected in a conventional art.
Figure 14:
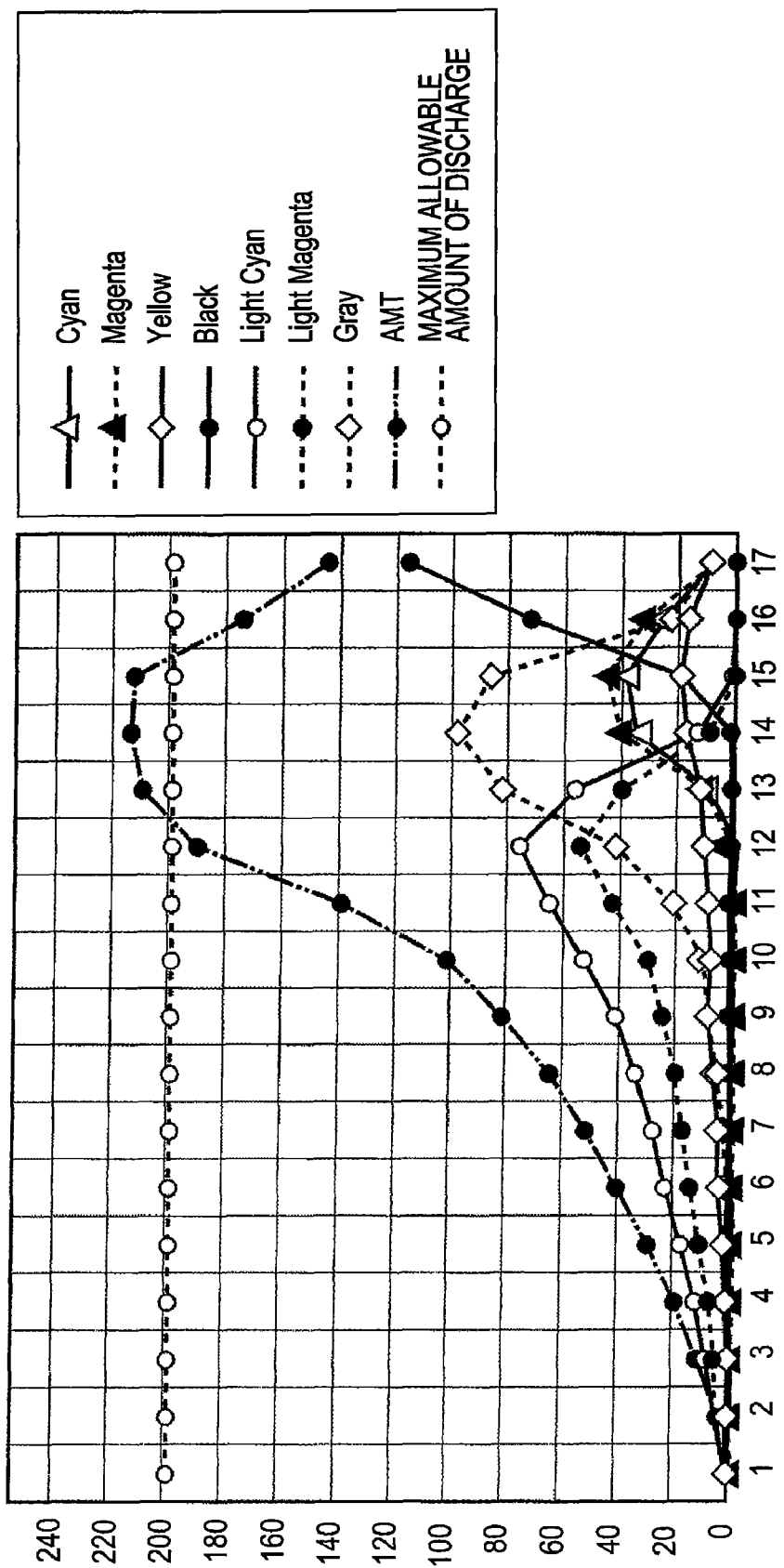
FIG. 14 illustrates another example of color separation before the amount of discharge is corrected in a conventional art.
Figure 15:
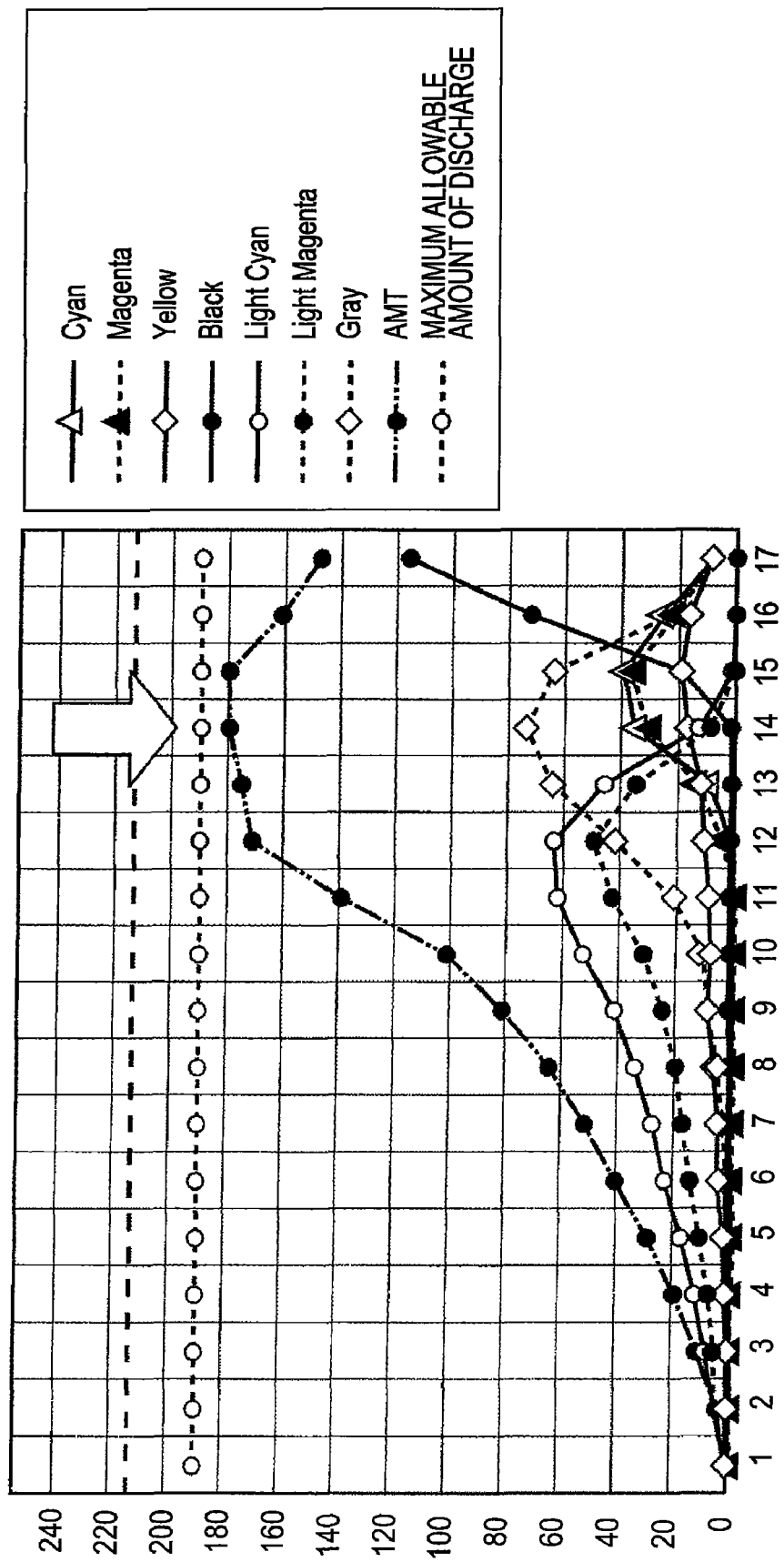
FIG. 15 illustrates another example of color separation after the amount of discharge is corrected in a conventional art.

FIG. 10 illustrates an example of color separation on the W-K line for medium 2 in case B shown in FIG. 6.

In this case, MAX 1 is 160 and MAX 2 is 190. The total amount of discharge for medium 2 does not exceed 190. For example, the ink value of cyan ink at grid point 11 for medium 1 is 59. After the correction of the amount of discharge, the ink value of cyan ink at grid point 11 is 62.5.

The present invention is not limited to correction in which the correction factor of the amount of discharge is determined by the difference between the total amount of discharge for medium 1 and that for medium 2, which is represented by the above expressions. The present invention may use any correction as long as the total amount of discharge for medium 2 is corrected so as to be smaller than the maximum allowable amount of discharge on the basis of the difference between the amounts of discharge. For example, only an area where the total amount of discharge exceeds the maximum allowable amount of discharge may be multiplied by the correction factor of the amount of discharge depending on the difference between the amounts of discharge. Alternatively, a predetermined amount may be subtracted from each of the amounts of discharge.

In this exemplary embodiment, one recording apparatus deals with two types of recording media. However, the apparatus can deal with three or more types of recording media. In such a case, a process of generating a color separation table described with reference to FIG. 6 is performed the number of times equal to the number of color separation tables.

Other Embodiments

The present invention is not limited to an apparatus or a method for achieving the above exemplary embodiment. The above exemplary embodiment can be achieved by supplying a software program for realizing the above exemplary embodiment to a computer (central processing unit (CPU) or micro-processing unit (MPU)) of a system or an apparatus and by causing the computer of the system or apparatus to operate the devices described above in accordance with the program.

Examples of a storage medium for storing the program include, but are not limited to, a flexible disk, a hard disk, a magneto-optical disk (MO), a compact disk read-only memory (CD-ROM), magnetic tape, a nonvolatile memory card, and a ROM.

The functions of the exemplary embodiment can be achieved by causing the computer to control the devices in accordance with the supplied program or in accordance with the supplied program in cooperation with an operating system (OS) or another software application running on the computer.

Furthermore, the exemplary embodiment can be achieved by, after writing the supplied program to a memory of an add-on expansion board of a computer or a memory of an add-on expansion unit connected to a computer, a process in which a CPU in the add-on expansion board or in the add-on expansion unit executes some of or all of the functions in the above-described embodiments under the control of the program.

As described above, the correction amount of grid-point data of grid points in a previously generated color separation table can be calculated from the difference between the total amount of ink discharge of the previously generated color separation table and the total amount of ink discharge of a color separation table to be newly generated. Therefore, the new color separation table can be generated on the basis of the calculated correction amount.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-272652 filed Sep. 20, 2005, which is hereby incorporated by reference herein in its entirety.

What is claimed is:

1. An image processing apparatus for generating a color separation table, the color separation table being used in converting an image signal to a signal for a colorant for use in a printer and storing grid-point data as the colorant signal so as to associate the grid-point data with a grid point defined in a color space of the image signal, the image processing apparatus comprising:

an inputting unit configured to input a first color separation table, a first amount indicating a maximum allowable amount of colorant for the first color separation table and a second amount indicating a maximum allowable amount of colorant for a second color separation table;

a comparing unit configured to compare the first amount with the second amount;

a determining unit configured to determine a correction amount to a total amount of colorant of the first color separation table by using a difference between the first amount and the second amount, wherein the correction amount is for decreasing the total amount of colorant of the first color separation table so that a total amount of colorant of the second color separation table does not exceed the second amount in case that the result of the comparing is that the first amount is larger than the second amount, and wherein the correction amount is for increasing the total amount of colorant of the first color separation table so that the total amount of colorant of the second color separation table does not exceed the second amount in case that the result of the comparing is that the first amount is not larger than the second amount; and a generation unit configured to generate a second color separation table based on the determined correction amount.

2. The image processing apparatus according to claim 1, wherein the determining unit is configured to determine the correction amount by determining a factor of correcting the first color separation table by using the difference and multiplying the grid-point data of the first color separation table by the factor.

3. An image processing method for an image processing apparatus including an inputting unit and a generation unit, to generate a color separation table, the color separation table being used in converting an image signal to a signal for a colorant for use in a printer and storing grid-point data as the colorant signal so as to associate the grid-point data with a grid point defined in a color space of the image signal, the image processing method comprising:

obtaining a first color separation table;

inputting, in the inputting unit, the first color separation table, a first amount indicating a maximum allowable amount of colorant for the first color separation table and a second amount indicating a maximum allowable amount of colorant for a second color separation table;

comparing the first amount with the second amount;

determining a correction amount to a total amount of colorant of the first color separation table by using a difference between the first amount and the second amount, wherein the correction amount is for decreasing the total amount of colorant of the first color separation table so that a total amount of colorant of the second color separation table does not exceed the second amount in case that the result of the comparing is that the first amount is larger than the second amount, and wherein the correction amount is for increasing the total amount of colorant of the first color separation table so that the total amount of colorant of the second color separation table does not exceed the second amount in case that the result of the comparing is that the first amount is not larger than the second amount; and generating, by the generation unit, a second color separation table based on the determined correction amount.

4. The image processing method according to claim 3, wherein determining a correction amount determines a factor of correcting the first color separation table by using the difference and multiplying the grid-point data of the first color separation table by the factor.

5. A computer-readable storage medium storing computer-executable instructions for causing a computer to perform image processing for generating a color separation table, the color separation table being used in converting an image signal to a signal for a colorant for use in a printer and storing grid-point data as the colorant signal so as to associate the grid-point data with a grid point defined in a color space of the image signal, the image processing comprising:

obtaining a first color separation table;

inputting the first color separation table, a first amount indicating a maximum allowable amount of colorant for the first color separation table and a second amount indicating a maximum allowable amount of colorant for a second color separation table;

comparing the first amount with the second amount;

determining a correction amount to a total amount of colorant of the first color separation table by using a difference between the first amount and the second amount, wherein the correction amount is for decreasing the total amount of colorant of the first color separation table so that a total amount of colorant of the second color separation table does not exceed the second amount in case that the result of the comparing is that the first amount is larger than the second amount, and wherein the correction amount is for increasing the total amount of colorant of the first color separation table so that the total amount of colorant of the second color separation table does not exceed the second amount in case that the result of the comparing is that the first amount is not larger than the second amount; and generating a second color separation table based on the determined correction amount.

6. An image processing apparatus for generating a color separation table, the color separation table being used in converting an image signal to a signal for a colorant for use in a printer and storing grid-point data as the colorant signal so as to associate the grid-point data with a grid point defined in a color space of the image signal, the image processing apparatus comprising:

an inputting unit configured to input a first color separation table, a first amount indicating a maximum allowable amount of colorant for the first color separation table and a second amount indicating a maximum allowable amount of colorant for a second color separation table;

a comparing unit configured to compare the first amount with the second amount;

a determining unit configured to determine a correction amount to a total amount of colorant of the first color separation table by using a difference between the first amount and the second amount, wherein the correction amount is for decreasing the total amount of colorant of the first color separation table so that a total amount of colorant of the second color separation table does not exceed the second amount in case that the result of the comparing is that the first amount is larger than the second amount, and wherein the correction amount is for increasing the total amount of colorant of the first color separation table so that the total amount of colorant of the second color separation table does not exceed the second amount in case that the result of the comparing is that the first amount is not larger than the second amount; and a generation unit configured to generate a second color separation table based on the determined correction amount; and a table-data generation unit configured to determine grid-point data of a grid point for the color separation table, wherein the table data generation unit is configured to determine grid-point data of a new color separation table corresponding to a second medium using grid-point data of an existing color separation table corresponding to a first medium based on the difference between a maximum allowable amount of colorant discharge for the existing color separation table and a maximum allowable amount of colorant discharge for the new color separation table so that a total amount of colorant discharge of the new color separation table does not exceed the maximum allowable amount of colorant discharge for the new color separation table.

7. An image processing method for an image processing apparatus including a table-data generation unit to generate a color separation table, the color separation table being used in converting an image signal to a signal for a colorant for use in a printer and storing grid-point data as the colorant signal so as to associate the grid-point data with a grid point defined in a color space of the image signal, the image processing method comprising:

inputting a first color separation table, a first amount indicating a maximum allowable amount of colorant for the first color separation table and a second amount indicating a maximum allowable amount of colorant for a second color separation table;

comparing the first amount with the second amount;

determining a correction amount to a total amount of colorant of the first color separation table by using a difference between the first amount and the second amount, wherein the correction amount is for decreasing the total amount of colorant of the first color separation table so that a total amount of colorant of the second color separation table does not exceed the second amount in case that the result of the comparing is that the first amount is larger than the second amount, and wherein the correction amount is for increasing the total amount of colorant of the first color separation table so that the total amount of colorant of the second color separation table does not exceed the second amount in case that the result of the comparing is that the first amount is not larger than the second amount;

generating a second color separation table based on the determined correction amount; and determining, by the table-generation unit, grid-point data of a grid point for the color separation table, wherein determining grid-point data of a grid point for the color separation table comprises determining grid-point data of a new color separation table corresponding to a second medium using grid-point data of an existing color separation table corresponding to a first medium based on the difference between a maximum allowable amount of colorant discharge for the existing color separation table and a maximum allowable amount of colorant discharge for the new color separation table so that a total amount of colorant discharge of the new color separation table does not exceed the maximum allowable amount of colorant discharge of the new color separation table.

8. A computer-readable storage medium storing computer-executable instructions for causing a computer to perform image processing for generating a color separation table, the color separation table being used in converting an image signal to a signal for a colorant for use in a printer and storing grid-point data as the colorant signal so as to associate the grid-point data with a grid point defined in a color space of the image signal, the image processing comprising:

inputting a first color separation table, a first amount indicating a maximum allowable amount of colorant for the first color separation table and a second amount indicating a maximum allowable amount of colorant for a second color separation table;

comparing the first amount with the second amount;

determining a correction amount to a total amount of colorant of the first color separation table by using a difference between the first amount and the second amount, wherein the correction amount is for decreasing the total amount of colorant of the first color separation table so that a total amount of colorant of the second color separation table does not exceed the second amount in case that the result of the comparing is that the first amount is larger than the second amount, and wherein the correction amount is for increasing the total amount of colorant of the first color separation table so that the total amount of colorant of the second color separation table does not exceed the second amount in case that the result of the comparing is that the first amount is not larger than the second amount;

determining grid-point data of a grid point for the color separation table; and generating a second color separation table based on the determined correction amount.

9. The image processing apparatus according to claim 1, wherein the determining unit is configured to determine grid-point data for the second color separation table by subtracting the correction amount from grid-point data for the first color separation table in case that the result of the comparing is that the first amount is larger than the second amount and by adding the correction amount to grid-point data for the first color separation table in case that the result of the comparing is that the first amount is not larger than the second amount.

10. The image processing method according to claim 3, wherein determining a correction amount further comprises determining grid-point data for the second color separation table by subtracting the correction amount from grid-point data for the first color separation table in case that the result of the comparing is that the first amount is larger than the second amount and by adding the correction amount to grid-point data for the first color separation table in case that the result of the comparing is that the first amount is not larger than the second amount.

11. The computer-readable storage medium according to claim 5, wherein determining a correction amount further comprises determining grid-point data for the second color separation table by subtracting the correction amount from grid-point data for the first color separation table in case that the result of the comparing is that the first amount is larger than the second amount and by adding the correction amount to grid-point data for the first color separation table in case that the result of the comparing is that the first amount is not larger than the second amount.

12. The image processing apparatus according to claim 6, wherein the determining unit is configured to determine grid-point data for the second color separation table by subtracting the correction amount from grid-point data for the first color separation table in case that the result of the comparing is that the first amount is larger than the second amount and by adding the correction amount to grid-point data for the first color separation table in case that the result of the comparing is that the first amount is not larger than the second amount.

13. The image processing method according to claim 7, wherein determining a correction amount further comprises determining grid-point data for the second color separation table by subtracting the correction amount from grid-point data for the first color separation table in case that the result of the comparing is that the first amount is larger than the second amount and by adding the correction amount to grid-point data for the first color separation table in case that the result of the comparing is that the first amount is not larger than the second amount.

14. The computer-readable storage medium according to claim 8, wherein determining a correction amount further comprises determining grid-point data for the second color separation table by subtracting the correction amount from grid-point data for the first color separation table in case that the result of the comparing is that the first amount is larger than the second amount and by adding the correction amount to grid-point data for the first color separation table in case that the result of the comparing is that the first amount is not larger than the second amount.

* * * * *